(12) United States Patent
Asdev et al.

(10) Patent No.: US 11,549,442 B2
(45) Date of Patent: Jan. 10, 2023

(54) AIR TURBINE STARTER CONTAINMENT SYSTEM

(71) Applicant: Unison Industries, LLC, Jacksonville, FL (US)

(72) Inventors: Jasraj Asdev, Bangalore (IN); Subrata Nayak, Bangalore (IN); David Allan Dranschak, Union, OH (US); Marc David Zinger, Dayton, OH (US); Shiloh Montegomery Meyers, Miamisburg, OH (US); Pallavi Tripathi, Bangalore (IN); Sharad Pundlik Patil, Bangalore (IN)

(73) Assignee: Unison Industries, LLC, Jacksonville, FL (US)

( * ) Notice: Subject to any disclaimer, the term of this patent is extended or adjusted under 35 U.S.C. 154(b) by 0 days.

(21) Appl. No.: 17/206,930

(22) Filed: Mar. 19, 2021

(65) Prior Publication Data

US 2021/0372328 A1 Dec. 2, 2021

(30) Foreign Application Priority Data

Mar. 26, 2020 (IN) .............................. 202011013216

(51) Int. Cl.
*F02C 7/277* (2006.01)
*F01D 11/12* (2006.01)
*F01D 21/04* (2006.01)

(52) U.S. Cl.
CPC ............ *F02C 7/277* (2013.01); *F01D 11/127* (2013.01); *F01D 21/045* (2013.01); *F05D 2220/323* (2013.01); *F05D 2250/283* (2013.01); *F05D 2260/85* (2013.01)

(58) Field of Classification Search
CPC ...... F04D 29/104; F04D 25/06; F04D 29/053; F04D 25/028; F04D 29/063; F04D 25/0606; F16H 2200/2005; F16H 2200/2007; F16H 3/724; F16H 57/029; H02K 5/1732; H02K 21/14; H02K 5/124; H02K 7/003; H02K 7/116; H02K 16/00; Y02E 10/72; F16J 15/3484
See application file for complete search history.

(56) References Cited

U.S. PATENT DOCUMENTS

| | | | |
|---|---|---|---|
| 1,698,514 | A | 1/1929 | Schmidt |
| 3,602,602 | A | 8/1971 | Motta |
| 4,547,122 | A | 10/1985 | Leech |
| 4,639,188 | A | 1/1987 | Swadley |
| 6,182,531 | B1 | 2/2001 | Gallagher et al. |
| 6,702,873 | B2 | 3/2004 | Hartman |
| 6,814,539 | B2 | 11/2004 | Farnsworth et al. |

(Continued)

FOREIGN PATENT DOCUMENTS

EP 3263848 A1 1/2018

*Primary Examiner* — Jacob M Amick
*Assistant Examiner* — Charles J Brauch
(74) *Attorney, Agent, or Firm* — McGarry Bair PC

(57) ABSTRACT

An air turbine starter for starting an engine, comprising a housing having an interior surface defining an interior, at least one turbine member rotatably mounted within the interior about a rotational axis, and having a plurality of circumferentially spaced blades, and a containment structure radially overlying and circumferentially surrounding at least a portion of the at least one turbine member.

20 Claims, 7 Drawing Sheets

(56) References Cited

U.S. PATENT DOCUMENTS

| | | |
|---|---|---|
| 7,596,938 B2 | 10/2009 | Bart et al. |
| 8,231,328 B2 | 7/2012 | Reed |
| 8,888,439 B2 | 11/2014 | Harper et al. |
| 8,932,002 B2 | 1/2015 | Makulec et al. |
| 9,062,565 B2 | 6/2015 | Mahan |
| 9,429,039 B2 | 8/2016 | Finlayson |
| 9,540,946 B2 | 1/2017 | Boeck |
| 9,598,978 B2 | 3/2017 | Hoyland et al. |
| 9,726,036 B2 | 8/2017 | Ertz et al. |
| 10,316,756 B2 * | 6/2019 | Gentile .................... F02C 7/20 |
| 2011/0052383 A1 * | 3/2011 | Lussier ................ F01D 21/045 |
| | | 156/190 |
| 2015/0345320 A1 | 12/2015 | Webb |
| 2016/0341070 A1 * | 11/2016 | Garcia .................. F04D 29/023 |
| 2019/0032564 A1 | 1/2019 | Martinez et al. |

\* cited by examiner

AIR TURBINE STARTER CONTAINMENT SYSTEM

CROSS REFERENCE TO RELATED APPLICATIONS

This application claims priority to India Provisional Application No. 202011013216, filed Mar. 26, 2020, which is incorporated herein by reference in its entirety.

TECHNICAL FIELD

The disclosure generally relates to a containment system for rotating components, specifically for a containment system surrounding a turbine rotor in an air turbine starter.

BACKGROUND

An aircraft engine, for example a gas turbine engine, is engaged in regular operation to an air turbine starter. The air turbine starter (ATS) can be used to initiate the rotation of the combustion engine. The ATS is often mounted near the engine and can be coupled to a high-pressure fluid source, such as compressed air, which impinges upon a turbine rotor in the ATS causing it to rotate at a relatively high rate of speed. The ATS includes an output shaft that is coupled to the turbine rotor, typically through a reducing gear box, to the engine. The output shaft thus rotates with the turbine wheel. This rotation in turn causes a rotatable element of the combustion engine (e.g. the crankshaft or the rotatable shaft) to begin rotating. The rotation by the ATS continues until the combustion engine attains a self-sustaining operating rotational speed.

BRIEF DESCRIPTION

Aspects and advantages of the invention will be set forth in part in the following description, or may be obvious from the description, or may be learned through practice of the invention.

In one aspect, the present disclosure relates to an air turbine starter for starting an engine, comprising a housing having an interior surface defining an interior, at least one turbine member rotatably mounted within the interior about a rotational axis, and having a plurality of circumferentially spaced blades, and a containment structure radially overlying and circumferentially surrounding at least a portion of the at least one turbine member and having a plurality of walls defining a cell structure forming a plurality of cells.

Another aspect the present disclosure relates to a method of containing an air turbine starter within an interior defined by a housing of the air turbine starter, the method comprising surrounding the turbine with a containment structure radially overlying and circumferentially surrounding at least a portion of the turbine member and having a plurality of walls defining a cell structure forming a plurality of cells.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures in which.

DETAILED DESCRIPTION

Figure 1:
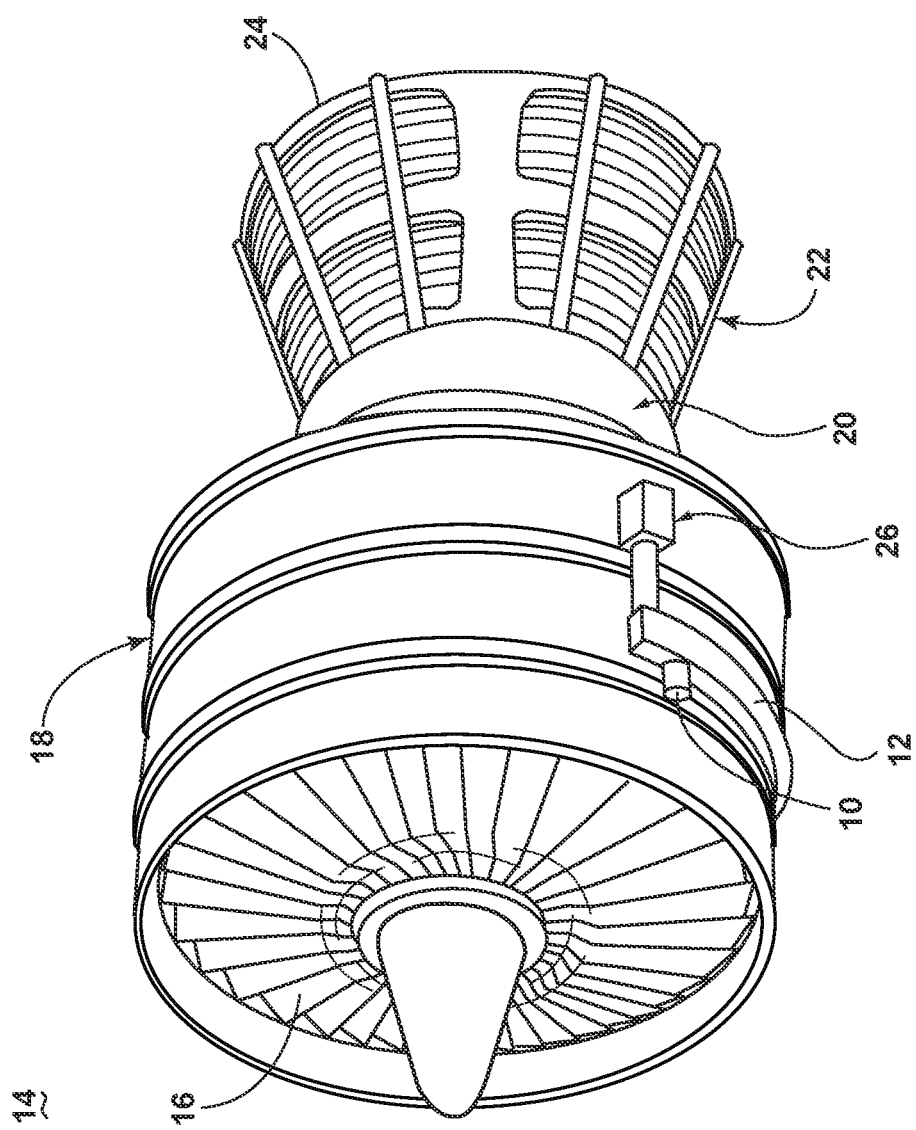
FIG. 1 is a perspective view of a turbine engine with an accessory gearbox and an air turbine starter in accordance with various aspects described herein.

Aspects of the present disclosure are directed to a turbine engine with an air turbine starter that includes a containment structure for retaining, containing, or otherwise reducing the expulsion of ATS components. While the examples described herein are directed to application of a turbine engine and a starter, the disclosure can be applied to any implementation of a driving mechanism that generates rotational motion at a driving output and provides the rotational motion to another piece of rotating equipment. For purposes of illustration, the present disclosure will be described with respect to a starter for an aircraft turbine engine, however, the starter can have various applications including starting a gas turbine engine.

The containment structure as described herein surrounds the turbine rotor and is configured to both contain components of the turbine as well as absorb energy dissipated. Typically, metals having high toughness properties are used to form a containment band.

A conventional air-turbine starter (ATS) includes a turbine rotor that rotates under pressurized air to transmit enough speed and torque to start a turbine engine. A metal containment shield can be mounted within the ATS to provide strength and rigidity that retains, contains, prevents, or otherwise reduces the expulsion of ATS components, including, but not limited to, turbine rotors, loose components or fragments, additional rotary components, or the like. The metal containment shield contributes significantly to weight and has limited deformation capabilities for absorbing impacts, kinetic energy, or the like. Containment systems typically include a solid metal containment band surrounding the turbine rotor that is formed of a metal having high toughness such as 17-4PH steel or INCO series metal. A higher toughness of the material results in a thinner containment band. Toughness is defined as the ability of a material to absorb energy and the plasticity to deform without fracturing. Toughness requires a balance of strength and ductility. Metals having a high toughness also have a high density which contributes to the overall weight of the containment system and the aircraft.

A drawback of a solid metal containment band is that during energy absorption, while the ring deforms during impact, once a crack initiates, very little incremental energy is required to propagate the crack resulting in containment band failure.

An alternate approach is to modify the structure of the containment band to include voids or spaces into the otherwise solid metal band. These spaces or voids can be defined by way of non-limiting example as cells, channels, tubes, or pockets. These structural changes can alter the way the containment band absorbs energy and deforms under an impact force by allowing for progressive or localized failure without impacting the structural integrity of the entire band. Further, these structural changes can require less metal alloy material to form the containment band, therefore decreasing the weight of the containment system while preserving or improving the specific energy absorption capability. Thus, this local 'layer-wise' or 'cell-wise' failure of the band can absorb more energy than a single thick solid band and prevent containment band failure.

Further still, incorporating lighter weight materials into all or portions of the containment band and/or structural modifications can further decrease the weight of the containment band while preserving or improving the specific energy absorption capability of the containment system.

As used herein, the term "upstream" refers to a direction that is opposite the fluid flow direction, and the term "downstream" refers to a direction that is in the same direction as the fluid flow. The term "fore" or "forward" means in front of something and "aft" or "rearward" means behind something. For example, when used in terms of fluid flow, fore/forward can mean upstream and aft/rearward can mean downstream.

Additionally, as used herein, the terms "radial" or "radially" refer to a direction away from a common center. For example, in the overall context of a turbine engine, radial refers to a direction along a ray extending between a center longitudinal axis of the engine and an outer engine circumference. Furthermore, as used herein, the term "set" or a "set" of elements can be any number of elements, including only one.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are used only for identification purposes to aid the reader's understanding of the present disclosure, and should not be construed as limiting on an embodiment, particularly as to the position, orientation, or use of aspects of the disclosure described herein. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

Referring to FIG. 1, an air turbine starter motor or ATS 10 is coupled to an accessory gear box (AGB) 12, also known as a transmission housing, and together are schematically illustrated as being mounted to a turbine engine 14 such as a gas turbine engine. This assembly is commonly referred to as an Integrated Starter/Generator Gearbox (ISGB). The turbine engine 14 comprises an air intake with a fan 16 that supplies air to a high pressure compression region 18. The air intake with a fan 16 and the high pressure compression region collectively are known as the 'cold section' of the turbine engine 14 upstream of the combustion. The high pressure compression region 18 provides a combustion chamber 20 with high pressure air. In the combustion chamber, the high pressure air is mixed with fuel and combusted. The hot and pressurized combusted gas passes through a high pressure turbine region 22 and a low pressure turbine region 24 before exhausting from the turbine engine 14. As the pressurized gases pass through the high pressure turbine region 22 and the low pressure turbine region 24, rotational energy is extracted from the flow of the gases passing through the turbine engine 14. A shaft can connect the high pressure turbine region 22 to the high pressure compression 18 region to power the compression mechanism. The low pressure turbine can be coupled to the fan 16 of the air intake by way of a shaft to power the fan 16.

The AGB 12 is coupled to the turbine engine 14 at either the high pressure or low pressure turbine region 22, 24 by way of a mechanical power take-off 26. The mechanical power take-off 26 contains multiple gears and means for mechanical coupling of the AGB 12 to the turbine engine 14. Under normal operating conditions, the power take-off 26 translates power from the turbine engine 14 to the AGB 12 to power accessories of the aircraft for example but not limited to fuel pumps, electrical systems, and cabin environment controls. The ATS 10 can be mounted on the outside of either the air intake region containing the fan 16 or on the core near the high-pressure compression region 18.

Figure 2:
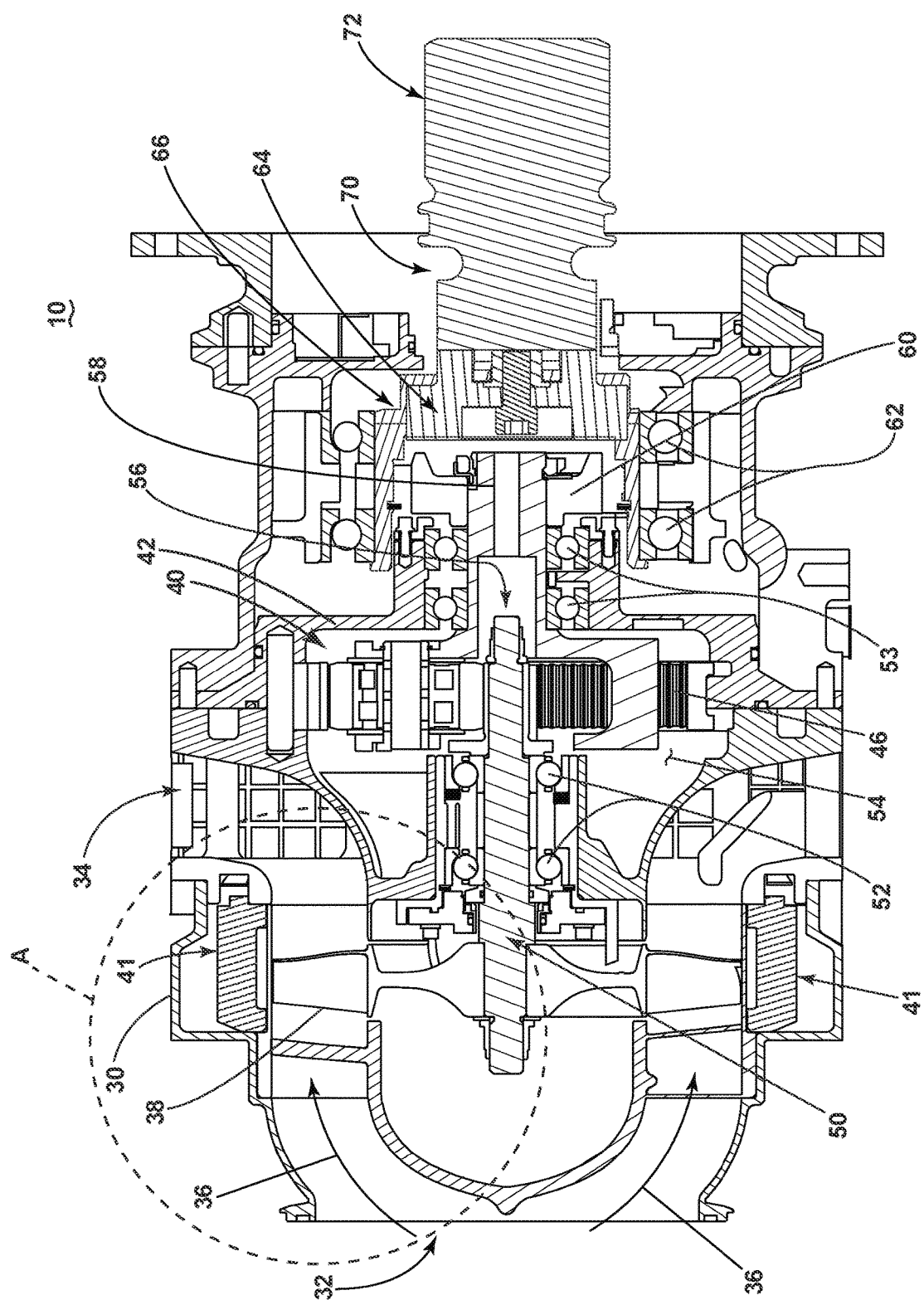
FIG. 2 is a cross-sectional view of an exemplary air turbine starter that can be included in FIG. 1.

Referring now to FIG. 2, the ATS 10, which can be mounted to the AGB 12 is shown in greater detail. Generally, the ATS 10 includes a housing 30 defining an inlet 32, an outlet 34, and a flow path 36 extending between the inlet 32 and outlet 34 for communicating a flow of gas there through. In one non-limiting example, the gas is air and is supplied from either a ground-operating air cart, an auxiliary power unit, or a cross-bleed start from an engine already operating. The ATS 10 includes a turbine member 38 within the housing 30 and disposed within the flow path 36 for rotatably extracting mechanical power from the flow of gas along the flow path 36. A containment system 41 is disposed in the housing 30 surrounding the turbine member 38. A gear box 42 is mounted within the housing 30. Further, a gear train 40, disposed within the gear box 42 and drivingly coupled with the turbine member 38, can be caused to rotate.

The gear train 40 includes a ring gear 46 and can further comprise any gear assembly including for example but not limited to a planetary gear assembly or a pinion gear assembly. A turbine shaft 50 couples the gear train 40 to the turbine member 38 allowing for the transfer of mechanical power to the gear train 40. The turbine shaft 50 is coupled to the gear train 40 and rotatably supported by a pair of turbine bearings 52. The gear train 40 is supported by a pair of carrier bearings 53. A gear box interior 54 can contain a lubricant, including, but not limited to, a grease or oil to provide lubrication and cooling to mechanical parts contained therein such as the gear train 40, ring gear 46, and bearings 52, 53.

There is an aperture 56 in the gear box 42 through which the turbine shaft 50 extends and meshes with a carrier shaft 58 to which a clutch 60 is mounted and supported by a pair of spaced bearings 62. A drive shaft 64 extends from the gear box 42 and is coupled to the clutch 60 and additionally supported by the pair of spaced bearings 62. The drive shaft 64 is driven by the gear train 40 and coupled to the AGB 12, such that during a starting operation the drive shaft 64 provides a driving motion to the AGB 12.

The clutch 60 can be any type of shaft interface portion that forms a single rotatable shaft 66 comprising the turbine shaft 50, the carrier shaft 58, and the drive shaft 64. The shaft interface portion can be by any known method of coupling including, but not limited to, gears, splines, a clutch mechanism, or combinations thereof.

The ATS 10 can be formed by any materials and methods, including, but not limited to, die-casting of high strength and lightweight metals such as aluminum, stainless steel, iron, or titanium. The housing 30 and the gear box 42 can be formed with a thickness sufficient to provide adequate mechanical rigidity without adding unnecessary weight to the ATS 10 and, therefore, the aircraft.

The rotatable shaft 66 can be constructed by any materials and methods, including, but not limited to extrusion or machining of high strength metal alloys such as those containing aluminum, iron, nickel, chromium, titanium, tungsten, vanadium, or molybdenum. The diameter of the turbine shaft 50, carrier shaft 58, and drive shaft 64 can be fixed or vary along the length of the rotatable shaft 66. The diameter can vary to accommodate different sizes, as well as rotor to stator spacing.

As described herein, air supplied along the flow path 36 rotates the turbine member 38 for driving the rotation of the rotatable shaft 66. Therefore, during starting operations, the ATS 10 can be the driving mechanism for the turbine engine 14 via rotation of the rotatable shaft 66. The non-driving mechanism, that is, the equipment being driven by the driving mechanism, can be understood as rotating equipment utilizing the rotational movement of the rotatable shaft 66, for example to generate electricity in the ATS 10.

The drive shaft 64 is further coupled to a decoupler 70. The decoupler 70 includes an output shaft 72, the output shaft 72 is operably coupled to the engine 14 such that the output shaft can rotate a portion of the engine 14.

Figure 3:
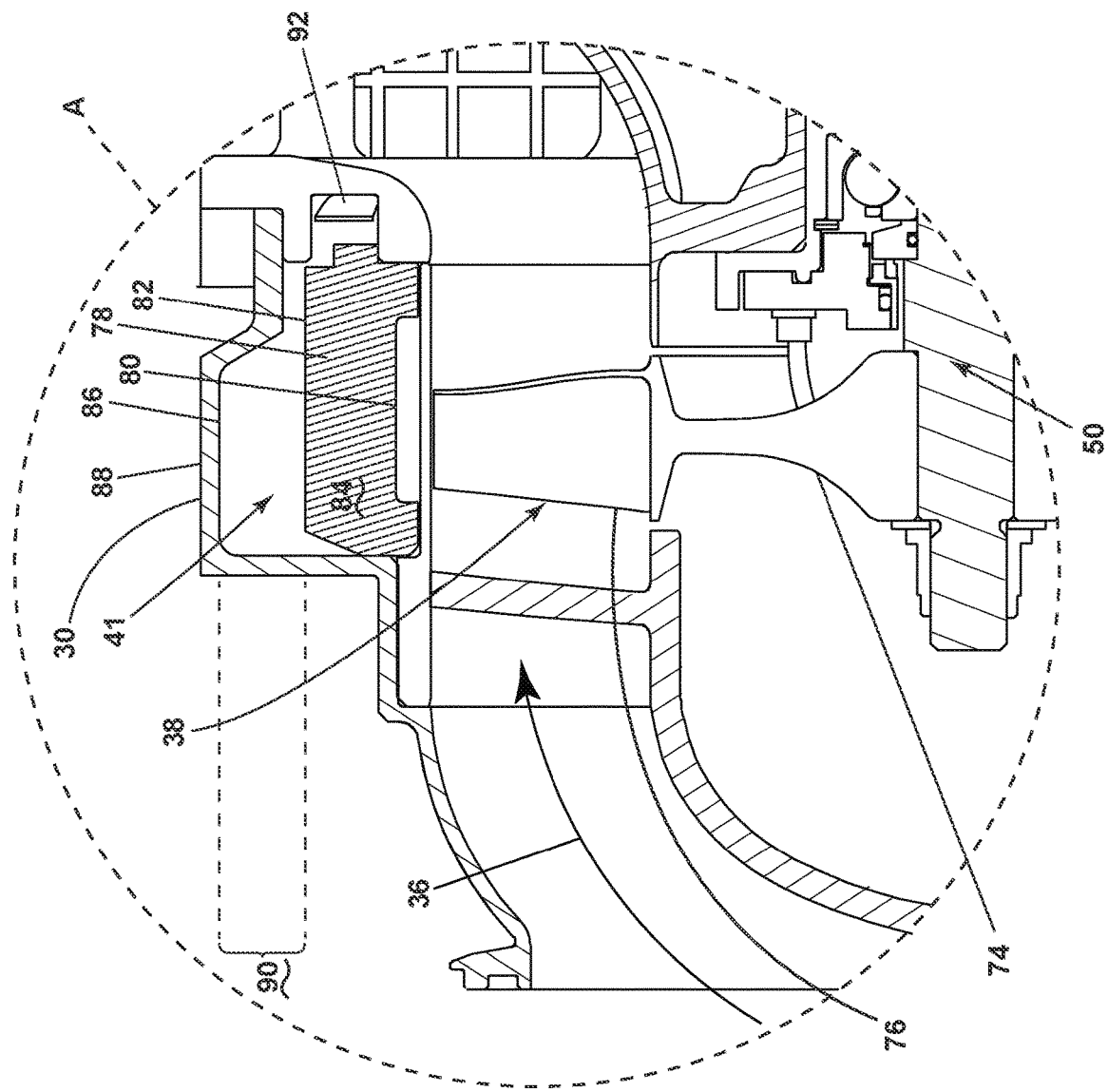
FIG. 3 is an enlarged cross-sectional view of a portion of the air turbine starter of FIG. 2 including a containment system.

FIG. 3 is an enlarged view of portion A from FIG. 2 of the ATS 10 illustrating a portion of the containment system 41 and the turbine member 38. The turbine member 38 is a rotating assembly mounted about a rotational axis of the turbine shaft 50. By way of non-limiting example, the turbine member 38 comprises a turbine disc 74 having a plurality of radiating airfoils illustrated as turbine blades 76. The containment system 41 comprises a containment structure described herein as a containment band 78 having an inner band surface 80 and an outer band surface 82 defining a thickness 84 of the containment band 78. The containment band 78 as described herein can be any containment structure utilized to surround the turbine member 38 in part or in whole and be formed from a continuous band or parts formed separately and mounted to each other. The inner band surface 80 can have a geometry complementary to the turbine member 38 such that the turbine member 38 can rotate freely in the housing 30 without contacting the containment band 78.

The housing 30 has an interior surface 86 defining an interior of the housing 30 and an outer surface 88 exterior to the housing 30. The outer band surface 82 of the containment band 78 and the interior surface 86 of the housing 30 can define a radial gap 90 between the containment band 78 and the housing 30.

The maximum amount of deformation the containment band 78 can undergo as described herein depends upon the size of the ATS 10 and the radial gap 90. The radial gap 90 allows for free deformation of the containment band 78. Free deformation of the containment band 78 can dissipate a portion of the energy, reducing the deformation of the housing 30, and reducing or eliminating potential energy transfer and damage to additional components of the housing 30.

During normal operation of the ATS 10 the containment band 78 is held in place in the housing 30 via one or more prestressed springs 92 inducing load on the containment band 78 against the housing 30. In the event components of the turbine disc 74 are free to move, the containment band 78 can become dislodged and rotate freely to dissipate some of the energy of any loose components and deform from its original shape around the loose components to absorb some of the energy from, and contain the loose components of the turbine disc 74, to prevent damage to adjacent parts of the ATS 10.

Figure 4:
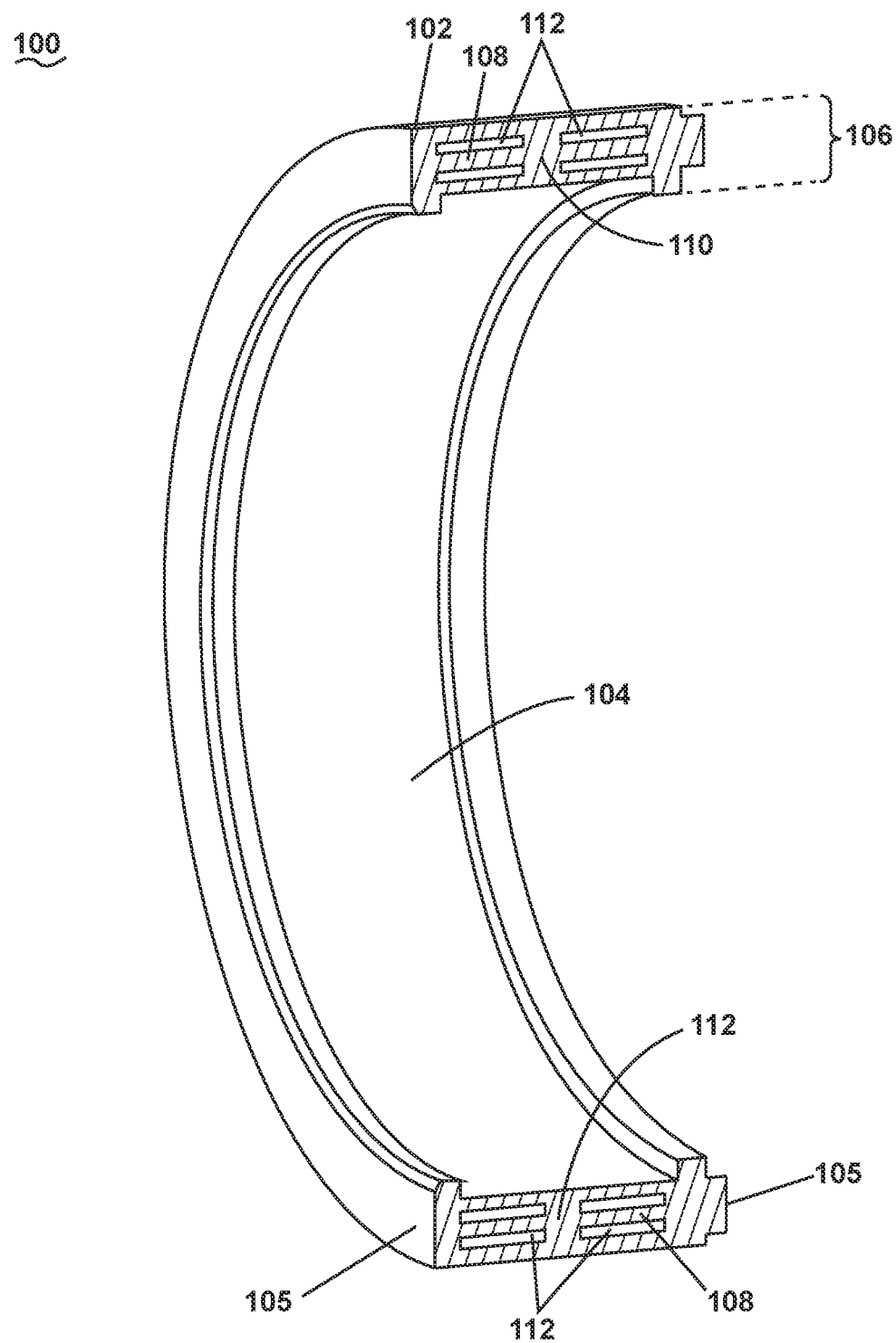
FIG. 4 is a perspective cross-sectional view of a containment band for the containment system of FIG. 3 according to an aspect of the disclosure herein.

FIG. 4 is a radial cross-sectional view of a containment band 100 in perspective according to an aspect of the present disclosure. Containment band 100 can be the containment band 78 of FIG. 3. The containment band 100 includes an outer band 102 and an inner band 104 joined between a pair of axially spaced edge walls 105 defining an interior body 106 of the containment band 100. The interior body 106 can include one or more interior layers 108 extending circumferentially within the containment band 100 and axially between the pair of axially spaced edge walls 105. Each interior layer 108 is in a spaced apart relationship with another interior layer 108, the outer band 102, or the inner band 104 dividing the interior body 106 into a plurality of cells, or channels 112, extending circumferentially. Optionally, one or more hoop stiffeners 110 can extend circumferentially within the containment band 100, integral with or bisecting one or more of the interior layers 108, and defining at least a portion of the one or more channels 112.

Figure 5:
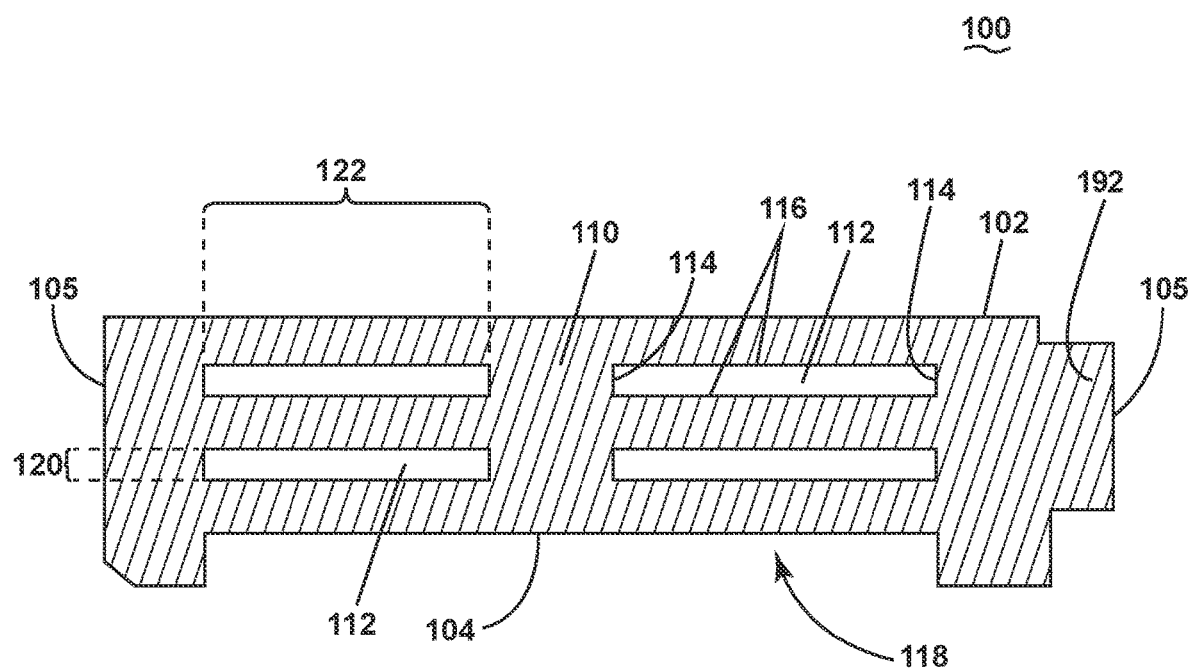
FIG. 5 is an enlarged cross-sectional view of a portion of the containment band of FIG. 4.

FIG. 5 is an enlarged radial cross-sectional view of FIG. 4 illustrating the interior body 106 in greater detail for the sake of clarity. The channels 112 are oriented to form one or more axially spaced columns of cells 118. Each of the one or more channels 112 is defined by a pair of radial walls 114 extending in the radial direction and defining a radial height 120. An opposing pair of axial walls 116 extend in the axial direction defining an axial length 122 greater than the radial height 120. The outer band 102, the inner band 104, and the interior layers 108 can form one or more of the axial walls 116. The axially spaced edge walls 105 and the one or more hoop stiffeners 110 can form one or more of the radial walls 114. Alternatively, when the containment band 100 is formed without one or more hoop stiffeners 110, the axially spaced edge walls 105 can form the radial walls 114 of each channel 112.

The interior layers 108, hoop stiffeners 110, outer band 102, and inner band 104 can be made from the same or different materials. By way of non-limiting example, the materials can include titanium, Inconel, stainless steel, aluminum, or other metal alloys. Additionally, the containment band 100 can include one or more layers of Shape Memory Alloy (SMA) forming all or a portion of any one or more of the outer band 102, inner band 104, axially spaced edge walls 105, interior layers 108, or hoop stiffeners 110 and extending circumferentially along the containment band 100.

Components of the turbine member 38 can exert an impact force on the containment band 100. The components can first contact the inner band 104 and begin to deform the inner band 104 into the interior body 106 of the containment band 100. If a portion of the containment band 100 exceeds a maximum deformation tolerance, the channels 112 are configured to bend and crush in that portion such that the remaining portions of the containment band 100 maintain structural integrity to contain the loose components of the turbine member 38. This progressive failure of the containment band 100 allows the containment band 100 to absorb more energy when compared to a solid metal containment band and can prevent cracks from forming which cause premature band failure, resulting in damage to the remaining parts of the ATS 10. Further, the containment band 100 can require less metal alloy material and portions can be constructed of lighter weight materials, which can decrease the overall weight of the containment system 41, and thus the aircraft.

Figure 6:
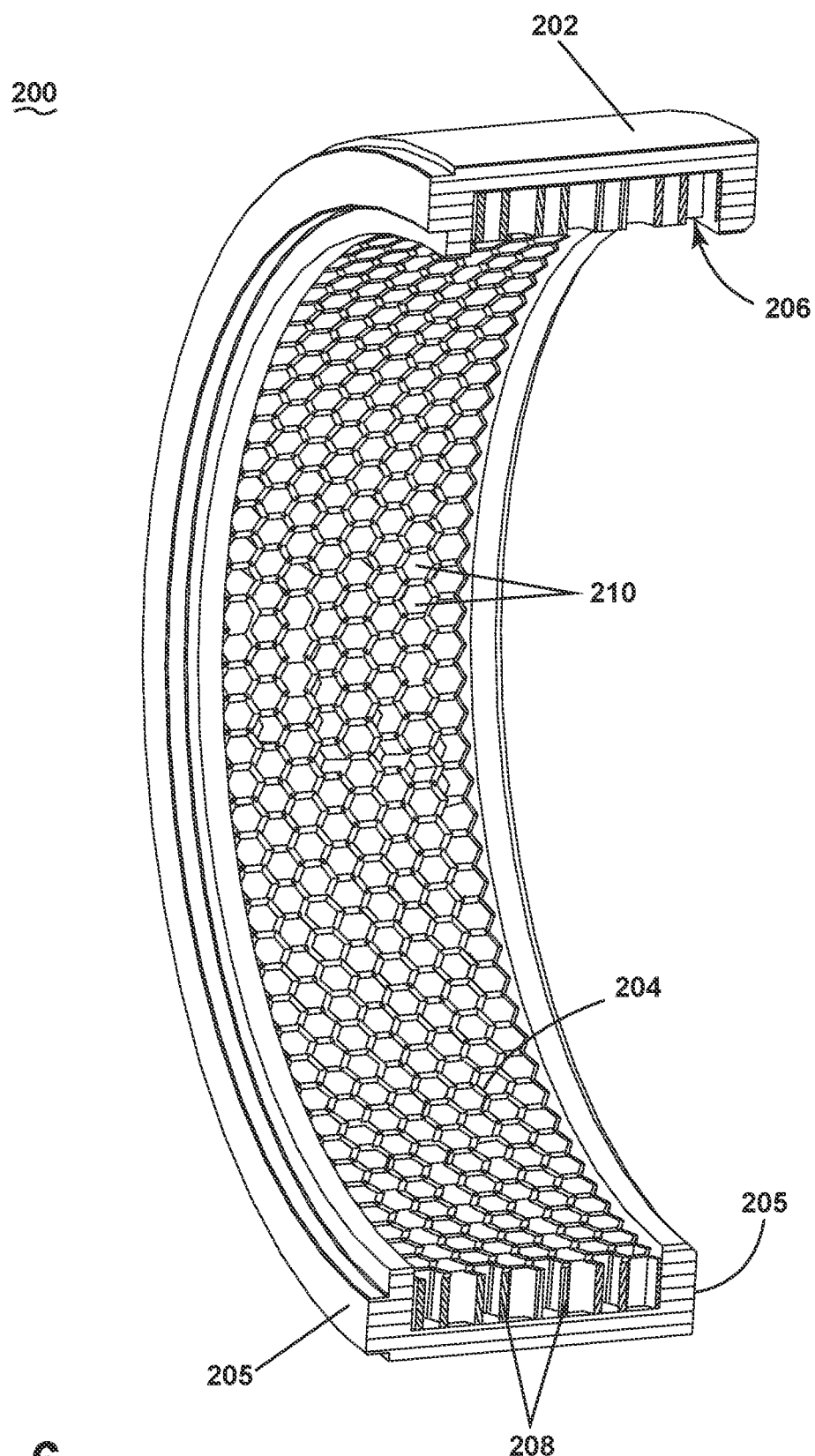
FIG. 6 is a perspective cross-sectional view of a containment band for the containment system of FIG. 3 according to another aspect of the disclosure herein.

FIG. 6 is a perspective cross-sectional view of a containment band 200 according to another aspect of the disclosure herein. The containment band 200 can be the containment band 78 of FIG. 3. The containment band 200 comprises an outer band 202 and an inner cell layer 204. The outer band 202 includes a pair of axially spaced edge walls 205 and together, the outer band 202 and the axially spaced edge walls 205 define an interior space 206 therebetween. The inner cell layer 204 is located in the interior space 206, extending circumferentially, and includes a plurality of walls 208 oriented to form a plurality of cells 210, therebetween. Each cell 210 is oriented such that the cell 210 is open to the turbine blades 76 of the turbine member 38. Optionally, more than one inner cell layers 204 can be located concentrically in the interior space 206 and be oriented such that the cells 210 from each layer 204 are in alignment or are in a staggered configuration.

The cells 210 can have a shape defined by the plurality of walls 208 configured to deform locally with minimal impact on an adjacent cell 210 and each cell 210 can have a regular, or symmetrical shape, or can have an irregular or asymmetrical shape. By way of non-limiting example, the cells 210 can define a honeycomb shape. In another example, the cells 210 can define a cylindrical shape. Further, each of the cells 210 can each have the same dimensions or different dimensions from another cell 210. Similarly, the plurality of walls 208 can each have the same thickness or different thicknesses.

The inner cell layer 204 can be formed of the same or different material from the outer band 202. Non-limiting examples include titanium, Inconel, stainless steel, aluminum, other metal alloys, or shape memory alloy (SMA). Further, the containment band 200 can include one or more layers of Shape Memory Alloy (SMA) forming all or a portion of any one or both of the outer band 202 or inner cell layer 204 and extending circumferentially along the containment band 200.

Components of the turbine member 38 can exert an impact force on the containment band 200. The components of the turbine member can first contact the inner cell layer 204. The cells 210 are configured to locally deform, crush, and buckle to absorb and dissipate energy from the impact while the outer band 202 deforms. This progressive failure of the cells 210 of the inner cell layer 204 allows the containment band 200 to absorb more energy compared to a typical solid metal containment band and provides structural integrity to the containment band 200 post impact, preventing premature failure of the containment band 200. Further, forming the inner cell layer 204 of lighter weight materials than the outer band 202 can decrease the weight of the containment system 41 overall, and thus the aircraft.

Figure 7:
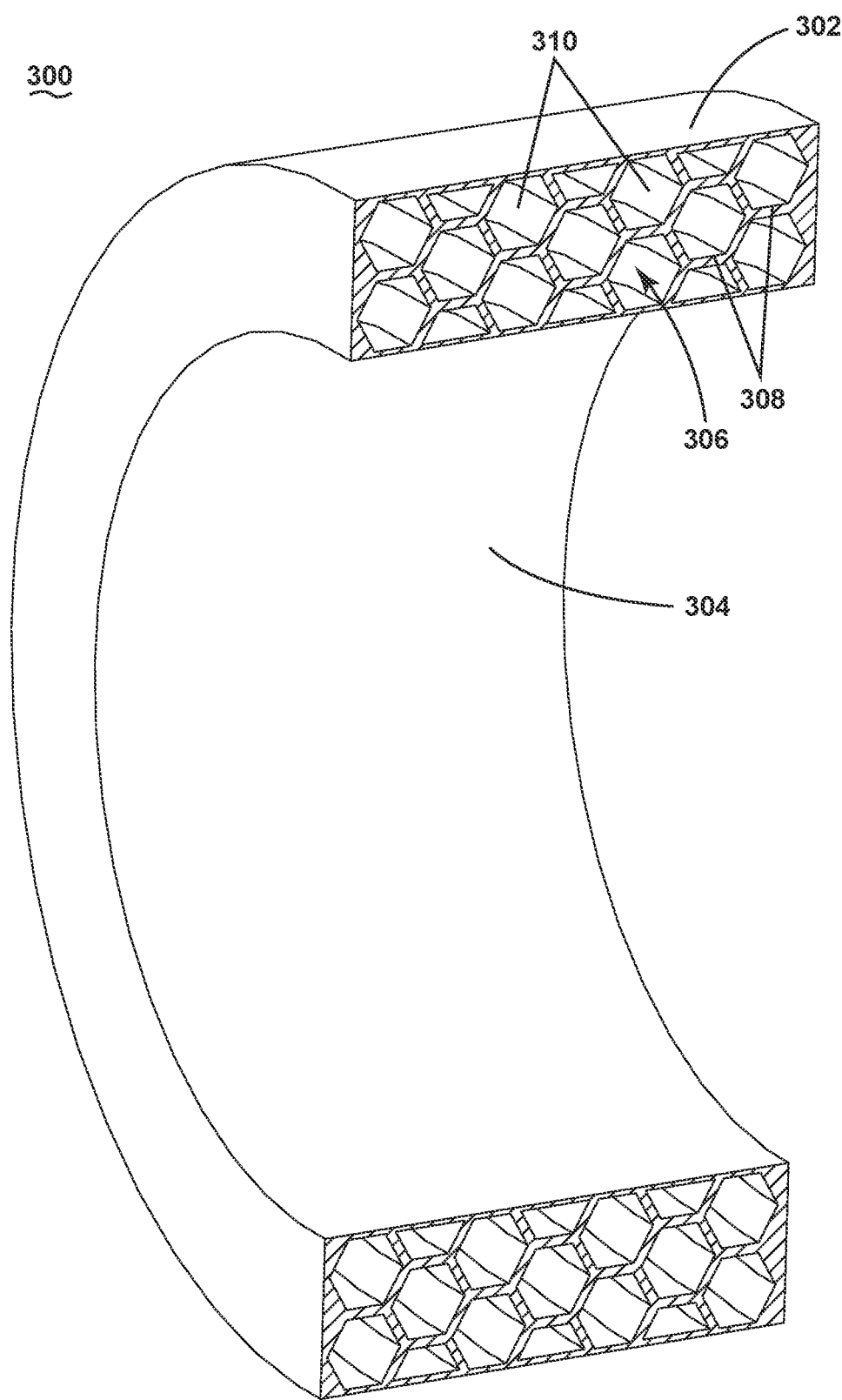
FIG. 7 is a perspective cross-sectional view of a containment band for the containment system of FIG. 3 according to another aspect of the disclosure herein.

FIG. 7 is a schematic cross-sectional view of a containment band 300 in perspective according to another aspect of the disclosure herein. Again, the containment band 300 can be the containment band 78 of FIG. 3. The containment band 300 includes an outer band surface 302 and an inner band surface 304 defining an interior space 306 therebetween. A plurality of interior walls 308 extend circumferentially, dividing the interior space 306 into a plurality of cells, or channels 310, extending circumferentially. The shape and the relative relationship of each of the plurality of interior walls 308 to another interior wall 308 define the shape of the channels 310 therebetween. The plurality of interior walls 308 can define the plurality of channels 310 to have a shape configured to deform locally with minimal impact on an adjacent channel 310 and each channel 310 can have a regular, or symmetrical shape, or can have an irregular or asymmetrical shape. By way of non-limiting example, the plurality of interior walls 308 can be configured to define a plurality of honeycomb-shaped channels 310. It should be understood that while honeycomb-shaped channels are illustrated, the channels 310 can be tubular with circular, square, rectangular or other shapes. Further, each of the channels 310 can have the same dimensions or different dimensions from another channel 310. Similarly, the plurality of walls 208 can each have the same thickness or different thicknesses.

The plurality of interior walls 308 can be formed of the same or different material from the outer or the inner band surfaces 302, 304. Non-limiting examples include titanium, Inconel, stainless steel, aluminum, other metal alloys, or shape memory alloy. Further, the containment band 300 can include one or more layers of Shape Memory Alloy (SMA) forming all or a portion of any one or more of the outer band surface 302, the inner band surface 304, or the plurality of interior walls 308 and extending circumferentially along the containment band 300.

Components of the turbine member 38 can exert an impact force on the containment band 300. The components of the turbine member 38 can first contact the inner band surface 304 and begin to deform the inner band surface 304 into the interior space 306. The channels 310 are configured to locally deform, crush, and buckle to absorb and dissipate energy from the impact while the outer band surface 302 deforms. This progressive failure of the plurality of interior walls 308 and channels 310 allows the containment band 300 to absorb more energy compared to a typical solid metal containment band and provides structural integrity to the containment band 300 post impact, preventing premature failure of the containment band 300. Further, forming the plurality of interior walls 308 of lighter weight materials than the outer and inner band surfaces 302, 304 can decrease the weight of the containment system 41.

While illustrated as a ring structure, it should be understood that the containment bands as described herein can be a containment structure formed in parts or as a whole singular piece. It is contemplated that parts of, or the entire containment structure is additively manufactured. An additive manufacturing (AM) process is where a component is built layer-by-layer by successive deposition of material. AM is an appropriate name to describe the technologies that build 3D objects by adding layer-upon-layer of material, whether the material is plastic or metal. AM technologies can utilize a computer, 3D modeling software (Computer Aided Design or CAD), machine equipment, and layering material. Once a CAD sketch is produced, the AM equipment can read in data from the CAD file and lay down or add successive layers of liquid, powder, sheet material or other material, in a layer-upon-layer fashion to fabricate a 3D object. It should be understood that the term "additive manufacturing" encompasses many technologies including subsets like 3D Printing, Rapid Prototyping (RP), Direct Digital Manufacturing (DDM), layered manufacturing and additive fabrication. Non-limiting examples of additive manufacturing that can be utilized to form an additively-manufactured component include powder bed fusion, vat photopolymerization, binder jetting, material extrusion, directed energy deposition, material jetting, or sheet lamination.

Further, the SMA material as described herein can be Ni—Ti alloy. SMA materials exhibit pseudo-elastic behavior allowing an article formed of SMA to return to its original shape after a deformation. In addition, SMAs have a high strain upon failure. Some SMA materials can have failure strains of 50-90% and twice the toughness of steel. Therefore, reinforcing a containment band by incorporating an SMA material can increase the energy absorbing capability of the containment system by allowing the containment band to deform to absorb energy while still maintaining enough structural integrity to contain any turbine rotor components. Further, the density of SMA is typically lower than steel. Therefore, replacing all or portions of the containment band 78 with SMA can decrease the overall weight of the containment band 78, and thus the entire aircraft.

By way of non-limiting example, the SMA described herein can comprise Nitinol which is an alloy having approximately 55% by weight nickel and 45% by weight titanium and annealed to form a part in the desired shape as is known in the art.

Benefits associated with the containment system described herein include utilizing voids, pockets, channels, or cell structures to modify the cross-sectional geometries of a containment band to improve energy absorbing capabilities through progressive failure. Incorporating a cellular structure allows the containment band to bend, buckle, crush, or deform locally, while maintaining the structural integrity of the containment band, mitigating structural failures, and improves the energy absorbing capability of the containment system. Using cellular structures comprising lighter weight materials to reinforce the metal containment band can increase the energy absorbing capabilities of the containment band while reducing the overall weight of the containment system, and thus the aircraft. This increases the efficiency of the aircraft, and protects the remaining parts of the ATS. Protecting the remaining parts of the ATS during a starter failure decreases costs associated with parts and maintenance required to repair the ATS.

To the extent not already described, the different features and structures of the various aspects can be used in combination with each other as desired. That one feature cannot be illustrated in all of the aspects is not meant to be construed that it cannot be, but is done for brevity of description. Thus, the various features of the different aspects can be mixed and matched as desired to form new examples, whether or not the new examples are expressly described. Combinations or permutations of features described herein are covered by this disclosure. Many other possible embodiments and configurations in addition to that shown in the above figures are contemplated by the present disclosure. Additionally, the design and placement of the various components such as starter, AGB, or components thereof can be rearranged such that a number of different in-line configurations could be realized.

This written description uses examples to disclose aspects of the invention, including the best mode, and also to enable any person skilled in the art to practice aspects of the invention, including making and using any devices or systems and performing any incorporated methods. The patentable scope of the invention is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

Further aspects of the invention are provided by the subject matter of the following clauses:

1. An air turbine starter for starting an engine, comprising a housing having an interior surface defining an interior, at least one turbine member rotatably mounted within the interior about a rotational axis, and having a plurality of circumferentially spaced blades, and a containment structure radially overlying and circumferentially surrounding at least a portion of the at least one turbine member and having a plurality of walls defining a cell structure forming a plurality of cells.

2. The air turbine starter of any of the preceding clauses, wherein the containment structure is a containment band.

3. The air turbine starter of any of the preceding clauses, wherein the plurality of cells define radially spaced layered cells.

4. The air turbine starter of any of the preceding clauses, wherein the containment structure defines a radial cross-section and the plurality of walls define an axial length and a radial height in the radial cross-section where the axial length is larger than the radial height.

5. The air turbine starter of any of the preceding clauses, wherein the plurality of cells are oriented in axially spaced columns.

6. The air turbine starter of any of the preceding clauses, wherein the plurality of cells extend circumferentially within the containment structure to define circumferential channels.

7. The air turbine starter of any of the preceding clauses, wherein the plurality of cells define a honeycomb structure.

8. The air turbine starter of any of the preceding clauses, wherein the plurality of walls extend radially such that each cell is open to the plurality of circumferentially spaced blades.

9. The air turbine starter of any of the preceding clauses, wherein the plurality of walls extend circumferentially such that each cell is a circumferentially extending honeycomb channel.

10. The air turbine starter of any of the preceding clauses, further comprising at least one layer of shape memory alloy extending circumferentially along at least a portion of the containment structure.

11. The air turbine starter of any of the preceding clauses, wherein the containment structure extends between an outer band surface and an inner band surface, where the outer band surface is spaced from an interior surface of the housing and the inner band surface faces the plurality of circumferentially spaced blades.

12. The air turbine starter of any of the preceding clauses, wherein the at least one layer of shape memory alloy extends along the outer band surface.

13. The air turbine starter of any of the preceding clauses, wherein the at least one layer of shape memory alloy extends along the inner band surface.

14. The air turbine starter of any of the preceding clauses, wherein the outer band surface is spaced from the interior surface of the housing to define a clearance distance.

15. A method of containing a turbine of an air turbine starter within an interior defined by a housing of the air turbine starter, the method comprising surrounding the turbine with a containment structure radially overlying and circumferentially surrounding at least a portion of the turbine member and having a plurality of walls defining a cell structure forming a plurality of cells.

16. The method of any the preceding clauses, further comprising forming the plurality of cells in radially spaced layers.

17. The method of any the preceding clauses, further comprising forming the plurality of cells in axially spaced columns.

18. The method of any the preceding clauses, further comprising forming the plurality of cells to define a honeycomb structure.

19. The method of any the preceding clauses, further comprising forming the honeycomb structure with each cell defining a circumferentially extending honeycomb channel.

20. The method of any the preceding clauses, further comprising forming at least one layer of a shape memory alloy along at least one of an outer surface or an inner surface of the containment structure.

What is claimed is:

1. An air turbine starter for starting a combustion engine, comprising:
 a housing defining an interior and having a flow path extending between an inlet and an outlet;
 at least one turbine member rotatably mounted within the interior for rotation about a rotational axis, and having a plurality of circumferentially spaced blades with at least a portion of the plurality of circumferentially spaced blades extending into the flow path;
 an output shaft drivingly coupled to the at least one turbine member; and
 a containment structure radially overlying and circumferentially surrounding at least a portion of the at least one turbine member and having:
  an outer band surface;
  a first edge wall extending from the outer band surface;
  a second edge wall extending from the outer band surface and being spaced axially aft of the first edge wall, with respect to the rotational axis; and
  a plurality of walls defining a cell structure forming a plurality of cells, with each cell of the plurality of cells having a channel defined by a hollow interior;
  wherein the outer band surface, the first edge wall and the second edge wall define an interior space formed therein, with the plurality of cells being provided within the interior space.

2. The air turbine starter of claim 1, wherein the containment structure is a containment band.

3. The air turbine starter of claim 1, wherein the plurality of cells define radially spaced layered cells.

4. The air turbine starter of claim 3, wherein the containment structure defines a radial cross-section and the plurality of walls define an axial length and a radial height in the radial cross-section where the axial length is larger than the radial height.

5. The air turbine starter of claim 4, wherein the plurality of cells are oriented in axially spaced columns.

6. The air turbine starter of claim 5, wherein the plurality of cells extend circumferentially within the containment structure to define circumferential channels.

7. The air turbine starter of claim 2, wherein the plurality of cells define a honeycomb structure.

8. The air turbine starter of claim 7, wherein the plurality of walls extend radially such that each cell is open to the plurality of circumferentially spaced blades.

9. The air turbine starter of claim 1, further comprising at least one layer of shape memory alloy extending circumferentially along at least a portion of the containment structure.

10. The air turbine starter of claim 9, wherein the containment structure extends between the outer band surface and an inner band surface, where the outer band surface is spaced from an interior surface of the housing and the inner band surface faces the plurality of circumferentially spaced blades.

11. The air turbine starter of claim 10, wherein the at least one layer of shape memory alloy extends along the outer band surface.

12. The air turbine starter of claim 10, wherein the at least one layer of shape memory alloy extends along the inner band surface.

13. The air turbine starter of claim 10, wherein the outer band surface is spaced from the interior surface of the housing to define a clearance distance.

14. A method of containing a turbine of an air turbine starter within an interior of the air turbine starter, the air turbine starter comprising a housing defining the interior and having a flow path extending between an inlet and an outlet, at least one turbine member rotatably mounted within the interior for rotation about a rotational axis and having a plurality of circumferentially spaced blades with at least a portion of the plurality of circumferentially spaced blades extending into the flow path, and an output shaft drivingly coupled to the at least one turbine member, the method comprising:
 surrounding the turbine with a containment structure radially overlying and circumferentially surrounding at least a portion of a turbine and having:
  an outer band surface;
  a first edge wall extending from the outer band surface;
  a second edge wall extending from the outer band surface and being spaced axially aft of the first edge wall, with respect to the rotational axis; and
  a plurality of walls defining a cell structure forming a plurality of cells, with each cell of the plurality of cells having a channel defined by a hollow interior;
  wherein the outer band surface, the first edge wall and the second edge wall define an interior space formed therein, with the plurality of cells being provided within the interior space.

15. The method of claim 14, further comprising forming the plurality of cells in radially spaced layers.

16. The method of claim 15, further comprising forming the plurality of cells in axially spaced columns.

17. The method of claim 14, further comprising forming the plurality of cells to define a honeycomb structure.

18. The method of claim 14, further comprising forming at least one layer of a shape memory alloy along at least one of the outer band surface or an inner surface of the containment structure.

19. The air turbine starter of claim 1, wherein each cell of the plurality of cells define a respective channel that extends at least circumferentially or radially with respect to the rotational axis.

20. The method of claim 14, further comprising forming each cell of the plurality of cells as a channel that extends at least circumferentially or radially with respect to the rotational axis.

* * * * *